No. 12,284. REISSUED NOV. 15, 1904.

L. P. MOOERS.

CHANGE SPEED GEARING.

APPLICATION FILED SEPT. 24, 1904.

2 SHEETS—SHEET 1.

Witnesses.
E. B. Gilchrist
B. W. Brockett.

Inventor:
Louis P. Mooers,
By his Attorneys,
Thurston & Bates.

No. 12,284. REISSUED NOV. 15, 1904.

L. P. MOOERS.

CHANGE SPEED GEARING.

APPLICATION FILED SEPT. 24, 1904.

2 SHEETS—SHEET 2.

Witnesses.
E. B. Filchrist
B. W. Brockett

Inventor
Louis P. Mooers,
By his Attorneys,
Thurston & Bates

No. 12,284. Reissued November 15, 1904.

UNITED STATES PATENT OFFICE.

LOUIS P. MOOERS, OF CLEVELAND, OHIO, ASSIGNOR, BY MESNE ASSIGNMENTS, TO THE PEERLESS MOTOR CAR COMPANY, OF CLEVELAND, OHIO, A CORPORATION OF WEST VIRGINIA.

CHANGE-SPEED GEARING.

SPECIFICATION forming part of Reissued Letters Patent No. 12,284, dated November 15, 1904.

Original No. 737,442, dated August 25, 1903. Application for reissue filed September 24, 1904. Serial No. 225,834.

*To all whom it may concern:*

Be it known that I, LOUIS P. MOOERS, a citizen of the United States, residing at Cleveland, in the county of Cuyahoga and State of Ohio, have invented a certain new and useful Improvement in Change-Speed Gearing, of which the following is a full, clear, and exact description, reference being had to the accompanying drawings.

My invention relates to the improvement in change-speed gearing especially applicable for use on automobiles which are driven by engines or motors which drive in only one direction and at approximately one speed.

The invention consists in the novel features of construction hereinafter described, reference being had to the accompanying drawings, which illustrate one form which I have contemplated embodying my invention in, and said invention is fully disclosed in the following description and claims.

The object of my invention is to provide mechanism whereby one shaft may be driven from a driving-shaft either backward or at different speeds forward at the will of the operator.

Figure 1:
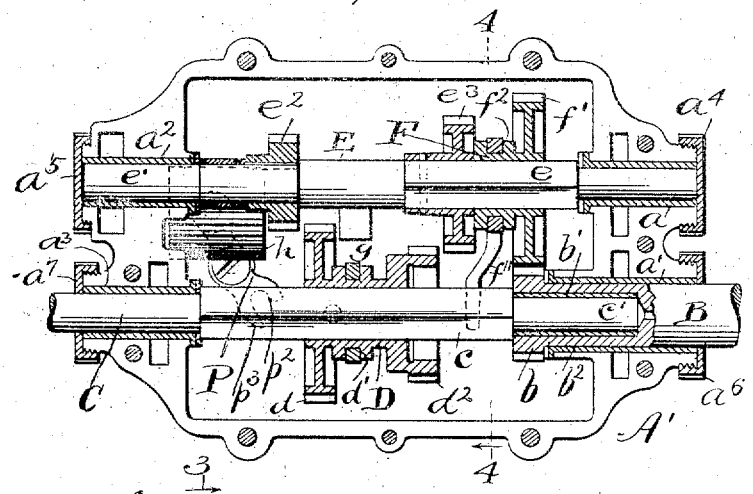
Figure 2:
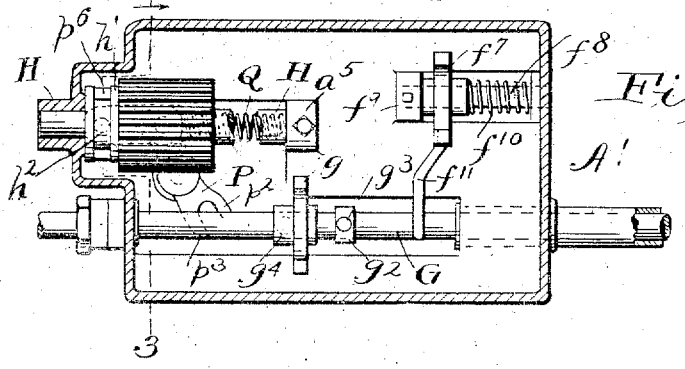
Figure 6:
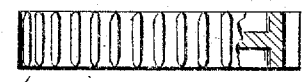
Figure 3:
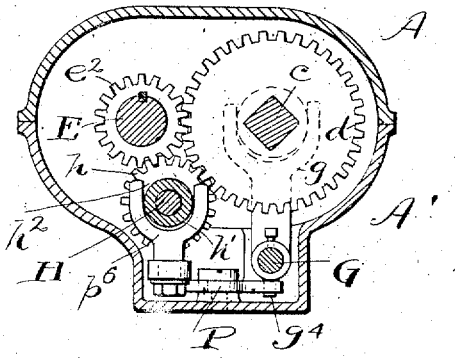
Figure 4:
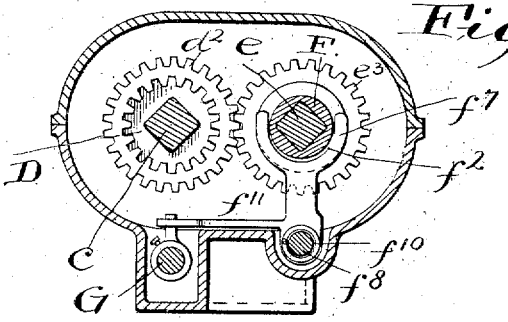
Figure 5:
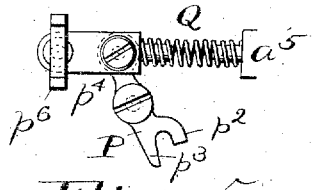

Referring to the drawings, Figure 1 is a top plan view of the lower section of the casing of my device, showing the gears and other parts in cross-section. Fig. 2 is a sectional plan view taken below the shafting and gearing, showing the operating mechanism. Fig. 3 represents a section on the line 3 3 of Fig. 2 looking to the right. Fig. 4 is a section on the line 4 4, Fig. 1, looking to the left. Fig. 5 is a detail view of the reversing-pinion shaft-shifter; and Fig. 6 is an enlarged view of one of the gears, and it illustrates one probably necessary structural characteristic of all of the gears.

In carrying out the above objects I employ a casing composed of the two parts A A′, having suitable openings in the ends thereof for supporting the bearing-boxes $a$ $a'$ $a^2$ $a^3$, which are held in place by the caps $a^4$ $a^5$ and the rings $a^6$ $a^7$.

In the bearing-box $a'$ is mounted the end of the main driving-shaft B, having rigidly secured thereto a small pinion $b$ and having in its inner end an axial cavity $b'$, which is adapted to receive a bushing $b^2$.

Mounted in the alined bearing $a^3$ is the shaft C, this being the shaft which the mechanism shown is designed to drive backward or forward at various speeds. This shaft has the squared portion $c$ and the cylindrical end $c'$, which is rotatively mounted in the bushing $b^2$. Slidably mounted upon the squared portion $c$ is the sleeve D, provided at one end with a spur-gear $d$ and at the other end with the internal clutch-teeth and external spur-gear teeth $d^2$. The internal clutch-teeth of the gear $d^2$ are adapted to engage and fit upon the small pinion $b$.

Mounted in the bearing-boxes $a$ $a^2$ is a counter-shaft E, provided with the squared portion $e$. A small pinion $e^2$ and a gear-wheel $e^3$ are rigidly secured to this shaft, and between the gear $e^3$ and the bearing $a$ upon the squared portion $e$ is slidably mounted the sleeve F, carrying a gear-wheel $f'$ and having a circumferential groove $f^2$. The squared portion $e$ is so located with respect to the shaft E that when the sleeve F abuts against the small pinion $e^3$ the gear-wheel $f'$ will mesh with the small pinion $b$. The sleeve F is moved into and out of this position by means of a fork $f^7$, which engages in its circumferential groove $f^2$ and is slidably mounted at its lower end upon the pin $f^8$, secured to the lug $f^9$ and to the casing. This fork is moved to and normally held against the lug $f^9$ (at which time the gear $f'$ and pinion $b$ are in engagement) by means of a spring $f^{10}$. An operating-arm $f^{11}$ is rigidly secured to said fork $f^7$ for a purpose which will hereinafter be described.

Located in the casing in a suitable position with respect to the sleeve D is the sliding shifting-rod G, having rigidly secured thereto a fork $g$, which engages in the circumferential groove $d'$ in said sleeve and serves as a means for shifting the sleeve D and the gears carried thereby. A collar $g^2$ is rigidly secured to the shifting-rod G and has projecting therefrom a lug $g^3$, so placed that it will engage the operating-arm $f^{11}$, and thereby shift the fork $f^7$, and consequently the sleeve F and its gear $f'$, which is thereby disengaged from the gear $b$. The collar $g^2$, with its lug $g^3$, is arranged upon the shifting-rod G, so that the teeth of the gear $d^2$ will be brought into complete engagement with the teeth of the gear $e^3$ before the lug $g^3$ engages the operating-arm $f^{11}$, and so, also, that the gear $f'$ will be entirely disengaged from the pinion $b$ before the internal clutch-teeth of gear $d^2$ engages said pinion.

A shaft H is secured to one end of the casing and to a lug $a^5$ therein, and on this shaft a broad pinion $h$ is rotatably mounted. This pinion has a hub $h'$, in which is a circumferential groove $h^2$. A lever P is pivoted to the casing below the pinion $h$. At one end of this lever is a pair of jaws $p^2$ $p^3$, one of said jaws, $p^3$, being longer than the other. To the other end of said lever is connected a slide $p^4$, having at one end an upwardly-extended fork $p^6$, which engages the groove $h^2$ and is designed to shift the broad pinion $h$. A spring Q acts to hold the slide in the position shown, although it is moved into that position by the action of pin $g^4$ on the lever P. The lever P is so located that its long jaw $p^3$ will lie in the path of the pin $g^4$ when the pinion $h$ is out of engagement with the other gears.

The device is manipulated in the following manner: If it is desired to retain the shaft C at rest, the sleeve D, with the gears, is left in the position shown in Fig. 1, with the gear $d$ out of engagement with the pinion $e^2$ and the external gear $d^2$ out of engagement with the gear $e^3$, and also with the internal clutch-teeth of the gear $d^2$ out of engagement with the pinion $b$. Should it be desired to obtain a medium speed, the sleeve D is moved so that the teeth of the gear $d^2$ will engage the gear $e^3$. High speed is obtained by shifting the rod G still farther in the same direction, and thereby carrying the gear $d^2$ along until the lug $g^3$ engages the arm $f^{11}$, thereby unlocking the gear $f'$ from the pinion $b$ and then bringing the internal clutch-teeth of the gear $d^2$ into engagement with the pinion $b$. When it is desired to drive the shaft C forward at slow speed, the shifting-rod G is moved in the contrary direction until the fork $g$ shifts the sleeve D and carries the gear-wheel $d$ into engagement with the small pinion $e^2$. To reverse the motion of the driving-shaft, the shifting-rod G is moved still farther in the same direction until the gear $d$ passes out of mesh with the pinion $e^2$, whereupon the lug $g^4$ engages the jaw $p^3$ of the lever P, thereby rocking the same and causing it, by means of the link $p^4$ (shown in Fig. 5) and the fork $p^6$, to move the broad pinion $h$ into engagement with the pinion $e^2$ and the gear $d$, which moves toward it. The movement of the different parts when in the position just described will be thus: Motion is conveyed from the pinion $b$ through the gear $f'$ to the shaft E, from thence by the pinion $e^2$ to the broad pinion $h$ and to the gear-wheel $d$, which drives the shaft C. This, by reason of the different movements of the gears, will convey a reverse movement to the driven shaft C. When the shifting-rod G is moved again in the opposite direction to disengage the reversing mechanism, the lug $g^4$ engages the arm $p^2$, thereby rocking the lever and positively moving the broad pinion $h$ out of engagement with the pinion $e^2$.

It will be noticed that the lever P is bent toward the operating-pin $g^4$. While the arm $p^3$ of the fork stands directly in the path of that pin the arm $p^2$ in idle position just clears it. As soon, however, as the lever P has begun to move on its pivot the arm $p^2$ travels crosswise behind the pin $g^4$, thus locking the two pivotally together for the remainder of the movement. The important result of this construction is that the reversing-pinion $h$ is acted on positively during the movement of sliding it into and out of engagement with the gear $e^2$. The spring Q is not relied upon to effect the disengagement, but only to force the pinion $h$ into its final position a short distance from the gear $e^2$ after it has been released therefrom to insure its normal retention in this idle position. If the spring were the means for causing the disengagement, it would sometimes happen that oil or dirt on the teeth of the pinion would overcome the action of the spring and prevent the disengagement, blocking the device and stripping the teeth.

In order to facilitate the engagement of the several gears as stated, it is probably necessary that the end of the several teeth be tapered and the end of the interdental spaces flaring, which construction is illustrated in Fig. 6.

Having described my invention, I claim—

1. The combination of the driven shaft C, the shaft E, a gear $e^2$ fast upon the latter shaft, an endwise-movable and normally inactive reversing-pinion $h$ adapted to be moved into mesh with gear $e^2$, a sliding gear $d$ on shaft C, a single shifting device, and mechanism operated thereby which moves the gear $d$ and pinion $h$ toward each other and carries the gear $d$ into engagement with gear $e^2$ and then past it, and carries the pinion $h$ into mesh with both gears $d$ and $d^2$.

2. The combination of the driven shaft C, the shaft E, a gear $e^2$ fast upon the latter shaft, an endwise-movable and normally inactive reversing-pinion $h$ adapted to be moved into mesh with gear $e^2$, a sliding gear $d$ on shaft C, a single shifting device for moving said gear $d$ in both directions along said shaft C, mechanism operated by said shifting device for moving the pinion $h$ toward and into mesh with gear $e^2$ and with the gear $d$, and a spring for holding such pinion $h$ in its inactive position.

3. In change-speed gearing, the combination of the driven gear $e^2$, the driven shaft C, a sliding gear $d$ movable lengthwise only on said shaft, an endwise-movable and normally inactive reversing-pinion, shifting mechanism for moving the gear $d$ into mesh with and past the gear $e^2$, a lever which is moved by said shifting mechanism and which moves the reversing-pinion out of its inactive position into mesh with the gears $d$ and $e^2$.

4. The combination of change-speed mechanism including a shiftable gear, a shiftable reversing-pinion, mechanism for shifting the gear independently of the reversing-pinion, and means operated by said mechanism for shifting the reversing-pinion.

5. The combination of change-speed mechanism including a shiftable gear, a shiftable reversing-pinion, mechanism for shifting the gear independently of the reversing-pinion, a gear for driving the reversing-pinion, and means operated by the gear-shifting mechanism to shift the reversing-pinion positively both into and out of mesh with said gear for driving it.

6. In change-speed gearing, the combination of a shiftable gear, a pinion for driving said gear, a normally idle reversing-pinion adapted to be brought into engagement with both said driving-pinion and said gear, means for concurrently shifting both the gear and the reversing-pinion, said means being positive for both the engaging and disengaging movements of the reversing-pinion.

7. In change-speed gearing, the combination of a shaft to be driven, a slidable gear thereon, a pinion for driving said gear, a normally idle reversing-pinion adapted to be brought into engagement with both said driving-pinion and said gear, mechanism for shifting the gear, means adapted to be engaged by said mechanism for shifting the reversing-pinion, said engagement after being established being positive for the effective movements of the reversing-pinion.

8. In change-speed gearing, the combination of a driving-gear, a gear to be driven, a normally idle reversing-pinion adapted to engage both of said gears, a lever for shifting said reversing-pinion having a forked end, an operating-pin adapted to engage said forked end and move in a direction to swing the lever and become pivotally locked thereto by such swinging.

9. In a change-speed gearing, the combination of a driving-gear, a gear to be driven, a normally idle reversing-pinion adapted to engage both of said gears, a lever for shifting said reversing-pinion having a forked end, an operating-pin adapted to engage said forked end and move in a direction to swing the lever and become pivotally locked thereto by such swinging, and a spring for forcing said reversing-pinion into its final idle position.

10. In a change-speed gearing, the combination of a driving-gear, a gear to be driven, a normally idle reversing-pinion adapted to engage both of said gears, a lever for shifting said reversing-pinion having a forked end, an operating-pin adapted to engage said forked end and move in a direction to swing the lever and become pivotally locked thereto by such swinging, said lever being inclined toward said operating-pin to insure positive locking of the pin and lever.

11. In a change-speed gearing, the combination of a driving-gear, a gear to be driven, a normally idle reversing-pinion adapted to engage both of said gears, a lever for shifting said reversing-pinion having a forked end, an operating-pin adapted to engage said forked end and move in a direction to swing the lever and become pivotally locked thereto by such swinging, said lever having the arm of its fork nearest the pin shorter than the other arm to insure positive locking of the pin and lever.

12. In a change-speed gearing, the combination of a driving-shaft, and an alined driven shaft, a parallel counter-shaft, and mechanism transmitting motion from the driving-shaft to the counter-shaft, with a gear fixed to the counter-shaft, a sliding gear movable lengthwise only upon the driven shaft, a reversing-pinion mounted upon an axis parallel with said shafts and movable along said axis, a single shifting device, and mechanism operated thereby to move the gear on the driven shaft, a slide carrying a fork which moves the reversing-pinion, a pivoted lever connected at one end with the last-mentioned slide, and having on its other end a fork of which one arm is longer than the other, a pin which is secured to the shifting device and which enters said fork, and a spring which acts to hold the reversing-gear in its normal inactive position.

13. In a change-speed gearing, the combination with the main driving-shaft, a small pinion secured thereto, a driven shaft, suitable sliding gears, movable endwise only on said driven shaft, for operating the same, a counter-shaft, a sliding gear movable endwise only upon said counter-shaft and adapted normally to be retained in engagement with the pinion on said main driving-shaft, a fixed gear upon said counter-shaft, a fixed pinion upon said counter-shaft, said gear upon said counter-shaft being adapted to mesh with a sliding gear upon the driven shaft, and said fixed pinion upon the counter-shaft being adapted to mesh with another sliding gear on the driven shaft, a second counter-shaft, a pinion loosely mounted upon the same adapted to be brought into engagement with the fixed pinion upon said first-mentioned counter-shaft, and to mesh with one of said gears upon the driven shaft when the fixed pinion upon said counter shaft and said gear on said driven shaft are out of engagement, and means for shifting all of said shiftable gears, substantially as described.

14. In a change-speed gearing, the combination with the main driving-shaft, a pinion secured thereto, and a driven shaft, of a counter-shaft, sliding gears, movable endwise only on said driven shaft, and adapted to rotate the same, a sliding gear movable endwise only on said counter-shaft and adapted to rotate the same, a shifting-fork controlling the movement of said gear and normally retaining the same in engagement with the pinion upon said main driving-shaft, an operating-arm secured to said gear-operating fork, a fixed gear and a pinion upon said counter-shaft, a second counter-shaft, a broad pinion loosely mounted upon said second counter-shaft, an operating-fork for said broad pinion, an operating-lever for said operating-fork, a shifting-rod, a fixed fork upon said shifting-rod adapted to shift the gears upon said driven shaft, a lug provided on said shifting-rod for tripping said operating-arm of said gear upon said first-mentioned counter-shaft, and a second lug provided upon said rod for engaging said operating-lever of said broad pinion, substantially as described.

15. In a change-speed gearing, the combination with the casing, and main driving-shaft, mounted in said casing, a pinion secured to said shaft, a driven shaft also mounted in said casing and having a shank having its bearing in the end of said main driving-shaft, sliding gears movable endwise only upon said driven shaft, one of said gears having internal clutch-teeth and the internal clutch-teeth being adapted to engage the pinion on the main driving-shaft, a counter-shaft rotatably mounted in said casing, a gear loosely mounted upon said counter-shaft and adapted to slide into and out of mesh with the gear on the driving-shaft, a pinion fixed upon said counter-shaft, a fork operating the gear loosely mounted upon said counter-shaft and normally retaining the same in engagement with the pinion upon the main driving-shaft, a coiled spring insuring this position, an operating-arm secured to said fork, a second counter-shaft rigidly mounted in the casing, a broad pinion loosely mounted upon said rigid counter-shaft, a lever mounted in said casing, a slide carried by said lever, a fork carried by said slide for operating said broad pinion, jaws upon said lever, a shifting-rod entering said casing, a fixed fork upon said rod for operating the slidably-mounted gears upon said counter-shaft, and a lug for engaging the jaws of said lever, thereby operating the same, substantially as described.

In testimony whereof I hereunto affix my signature in the presence of two witnesses.

LOUIS P. MOOERS.

Witnesses:
ALBERT H. BATES,
B. W. BROCKETT.